US012359576B2

(12) United States Patent
Kang

(10) Patent No.: US 12,359,576 B2
(45) Date of Patent: Jul. 15, 2025

(54) TURBINE BLADE SEAL ASSEMBLY STRUCTURE AND GAS TURBINE INCLUDING SAME

(71) Applicant: DOOSAN ENERBILITY CO., LTD., Changwon-si (KR)

(72) Inventor: Joo Hyung Kang, Changwon-si (KR)

(73) Assignee: Doosan Enerbolity Co., Ltd., Changwon-si (KR)

( * ) Notice: Subject to any disclaimer, the term of this patent is extended or adjusted under 35 U.S.C. 154(b) by 0 days.

(21) Appl. No.: 18/616,499

(22) Filed: Mar. 26, 2024

(65) Prior Publication Data

US 2024/0337189 A1 Oct. 10, 2024

(30) Foreign Application Priority Data

Apr. 4, 2023 (KR) ........................ 10-2023-0044344

(51) Int. Cl.
*F01D 5/32* (2006.01)
*F01D 5/30* (2006.01)

(52) U.S. Cl.
CPC ........... *F01D 5/323* (2013.01); *F01D 5/3015* (2013.01); *F05D 2260/202* (2013.01)

(58) Field of Classification Search
CPC ......... F01D 5/323; F01D 5/326; F01D 5/3015
See application file for complete search history.

(56) References Cited

U.S. PATENT DOCUMENTS 3,572,966 A * 3/1971 Borden ................... F01D 5/081 415/177
4,021,138 A * 5/1977 Scalzo ...................... F01D 5/18 416/193 A
7,040,866 B2 * 5/2006 Gagner ................. F01D 5/3015 416/220 R
8,226,366 B2 * 7/2012 Brucher ................ F01D 5/3015 416/221
11,021,974 B2 * 6/2021 Freeman ............... F01D 5/3015
12,188,375 B2 * 1/2025 Kang .................... F01D 5/3007
(Continued)

FOREIGN PATENT DOCUMENTS

JP 2010-523873 A 7/2010
JP 2012-506968 A 3/2012
(Continued)

OTHER PUBLICATIONS

Office Action in Korean Application 10-2023-0044344 dated Mar. 16, 2025, 8 pages.

*Primary Examiner* — Eldon T Brockman
(74) *Attorney, Agent, or Firm* — Shook, Hardy & Bacon L.L.P.

(57) ABSTRACT

Proposed is a turbine blade seal assembly structure including a turbine blade comprising an airfoil part, a platform part, and a root part, a turbine rotor disk allowing the root part of the turbine blade to be mounted thereto and having a mounting rib extending radially from one axial side of the turbine rotor disk to form a mounting groove, a retainer plate mounted between the platform part and one side part of the turbine rotor disk so as to seal a cooling flow path formed inside the root part and the platform part, and an insert key inserted axially into an upper end of the mounting rib and inserted into a lower end of the retainer plate to support the retainer plate.

20 Claims, 6 Drawing Sheets

(56) References Cited

U.S. PATENT DOCUMENTS

| | | | | |
|---|---|---|---|---|
| 2002/0018719 | A1* | 2/2002 | Arilla | F01D 11/006 416/220 R |
| 2008/0181768 | A1 | 7/2008 | Brucher | |
| 2011/0027092 | A1* | 2/2011 | Engle | F01D 5/3015 416/220 R |
| 2017/0037736 | A1 | 2/2017 | Dungs et al. | |
| 2018/0023401 | A1* | 1/2018 | Hoell | F01D 5/3015 416/220 R |
| 2018/0135440 | A1 | 5/2018 | Wines et al. | |
| 2022/0056806 | A1* | 2/2022 | Kwak | F01D 5/3015 |

FOREIGN PATENT DOCUMENTS

| | | | |
|---|---|---|---|
| JP | 2013050105 | A | 3/2013 |
| JP | 2013234588 | A | 11/2013 |
| JP | 2015086749 | A | 5/2015 |
| KR | 20200020415 | | 2/2020 |

* cited by examiner

TURBINE BLADE SEAL ASSEMBLY STRUCTURE AND GAS TURBINE INCLUDING SAME

CROSS REFERENCE TO RELATED APPLICATION

The present application claims priority to Korean Patent Application No. 10-2023-0044344, filed on Apr. 4, 2023, the entire contents of which are incorporated herein for all purposes by this reference.

BACKGROUND

1. Technical Field

The present disclosure relates to a turbine blade seal assembly structure and a gas turbine including the same.

2. Description of the Related Art

A turbine is a mechanical device that obtains rotational force through impulse or reaction force by using the flow of a compressible fluid such as steam or gas, and includes a steam turbine that uses steam and a gas turbine that uses high-temperature combustion gas.

Among these, the gas turbine largely consists of a compressor, a combustor, and a turbine. The compressor is provided with an air inlet for introducing air, and a plurality of compressor vanes and a plurality of compressor blades are arranged alternately within a compressor housing.

The combustor supplies fuel to air compressed from the compressor and ignites it with a burner, thereby generating high-temperature and high-pressure combustion gas.

The turbine has a plurality of the turbine vanes and a plurality of turbine blades arranged alternately within a turbine housing. In addition, a rotor is arranged to pass through the center of each of the compressor, the combustor, the turbine, and an exhaust chamber.

Each of opposite end parts of the rotor is rotatably supported by a bearing. In addition, a plurality of disks is fixed to the rotor so that each blade is connected thereto, and a drive shaft of a generator is connected to the end part of the exhaust chamber.

Such a gas turbine does not have a reciprocating mechanism like a piston of a four-stroke engine, so there is no mutual friction like friction between a piston and a cylinder, thereby making the consumption of lubricant extremely low, greatly reducing amplitude, which is a characteristic of a reciprocating mechanism, and enabling high-speed movement.

To briefly explain the operation of the gas turbine, high-temperature combustion gas is generated as air compressed in the compressor is mixed with fuel and burned, and this combustion gas is injected to the turbine. As the injected combustion gas passes through each of the turbine vanes and each of the turbine blades, it generates rotational force, causing the rotor to rotate.

A cold air flow path for supplying cooling air from a turbine rotor disk to the turbine blade may be formed inside a root part of the turbine blade. To form and seal the cold air flow path, a retainer plate may be tightly coupled to the root part of the turbine blade and opposite axial sides of the rotor disk.

According to a conventional technology, the retainer plate is fixed to the root part of the turbine blade by a fastening bolt. However, there is a problem in that the head of the bolt protrudes from the retainer plate and has friction with gas during high-speed rotation, which causes a windage loss. In addition, since centrifugal force caused by the assembly of the blade with the root part is large, the weight of the bolt may cause stress increasing on the root part of the blade.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine blade seal assembly structure and a gas turbine including the same, in which the lower end part of a retainer plate is fixed to a turbine rotor disk, a part of a fixing member protruding from each of the retainer plate and the rotor disk is removed to reduce efficiency loss due to gas friction, a load applied to a root part of a blade can be minimized to improve the structural stability of the blade, stress concentration on the turbine rotor disk and the retainer plate can be minimized, and parts can be easily processed and assembled.

In order to achieve the above objectives, a turbine blade seal assembly structure of the present disclosure includes: a turbine blade including an airfoil part, a platform part, and a root part; a turbine rotor disk allowing the root part of the turbine blade to be mounted thereto and having a mounting rib extending radially from one axial side of the turbine rotor disk to form a mounting groove; a retainer plate mounted between the platform part and one side part of the turbine rotor disk so as to seal a cooling flow path formed inside the root part and the platform part; and an insert key inserted axially into an upper end of the mounting rib and inserted into a lower end of the retainer plate to support the retainer plate.

The mounting rib may include a key slot formed by penetrating the mounting rib in a thickness direction thereof from an upper surface thereof so that the insert key is inserted into the key slot.

The key slot may be formed such that an upper width of the key slot is smaller than a lower width thereof.

The insert key may include: a body part inserted into a lower part of the key slot; an upper part formed integrally on the body part and inserted into an upper part of the key slot; and an insertion protrusion part extending from the body part and inserted into the lower end of the retainer plate.

The body part may be formed to have a width decreasing gradually upward.

The upper part may be formed to have a constant width.

The retainer plate may include an inclined surface part inserted into the mounting groove of the turbine rotor disk to be supported radially outward.

The retainer plate may further include a protrusion insertion groove formed in a lower surface thereof so that the insert key is inserted into the protrusion insertion groove.

A surface near a lower end of the insert key inserted into the key slot of the mounting rib may be punched so that the insert key is axially fixed.

The key slot of the mounting rib may include a plurality of key slots, wherein the insert key may be inserted into each of the plurality of key slots.

A gas turbine of the present disclosure includes: a compressor configured to suck in and compress outside air; a combustor configured to mix fuel with air compressed in the compressor and combust the fuel; and a turbine rotated by combustion gas discharged from the combustor, wherein the turbine includes: the turbine blade including the airfoil part, the platform part, and the root part; the turbine rotor disk allowing the root part of the turbine blade to be mounted thereto and having the mounting rib extending radially from one axial side of the turbine rotor disk to form the mounting groove; the retainer plate mounted between the platform part and one side part of the turbine rotor disk so as to seal the cooling flow path formed inside the root part and the platform part; and the insert key inserted axially into the upper end of the mounting rib and inserted into the lower end of the retainer plate to support the retainer plate.

The mounting rib may include the key slot formed by penetrating the mounting rib in a thickness direction thereof from an upper surface thereof so that the insert key is inserted into the key slot.

The key slot may be formed such that the upper width of the key slot is smaller than the lower width thereof.

The insert key may include: the body part inserted into the lower part of the key slot; the upper part formed integrally on the body part and inserted into the upper part of the key slot; and the insertion protrusion part extending from the body part and inserted into the lower end of the retainer plate.

The body part may be formed to have a width decreasing gradually upward.

The upper part may be formed to have a constant width.

The retainer plate may include the inclined surface part inserted into the mounting groove of the turbine rotor disk to be supported radially outward.

The retainer plate may further include the protrusion insertion groove formed in the lower surface thereof so that the insert key is inserted into the protrusion insertion groove.

The surface near the lower end of the insert key inserted into the key slot of the mounting rib may be punched so that the insert key is axially fixed.

The key slot of the mounting rib may include the plurality of key slots, wherein the insert key may be inserted into each of the plurality of key slots.

According to the turbine blade seal assembly structure and the gas turbine including the same of the present disclosure, the lower end part of a retainer plate is fixed to a turbine rotor disk, a part of a fixing member protruding from each of the retainer plate and the rotor disk is removed to reduce efficiency loss due to gas friction, a load applied to a root part of a blade can be minimized to improve the structural stability of the blade, stress concentration on the turbine rotor disk and the retainer plate can be minimized, and parts can be easily processed and assembled.

DETAILED DESCRIPTION

Figure 1:
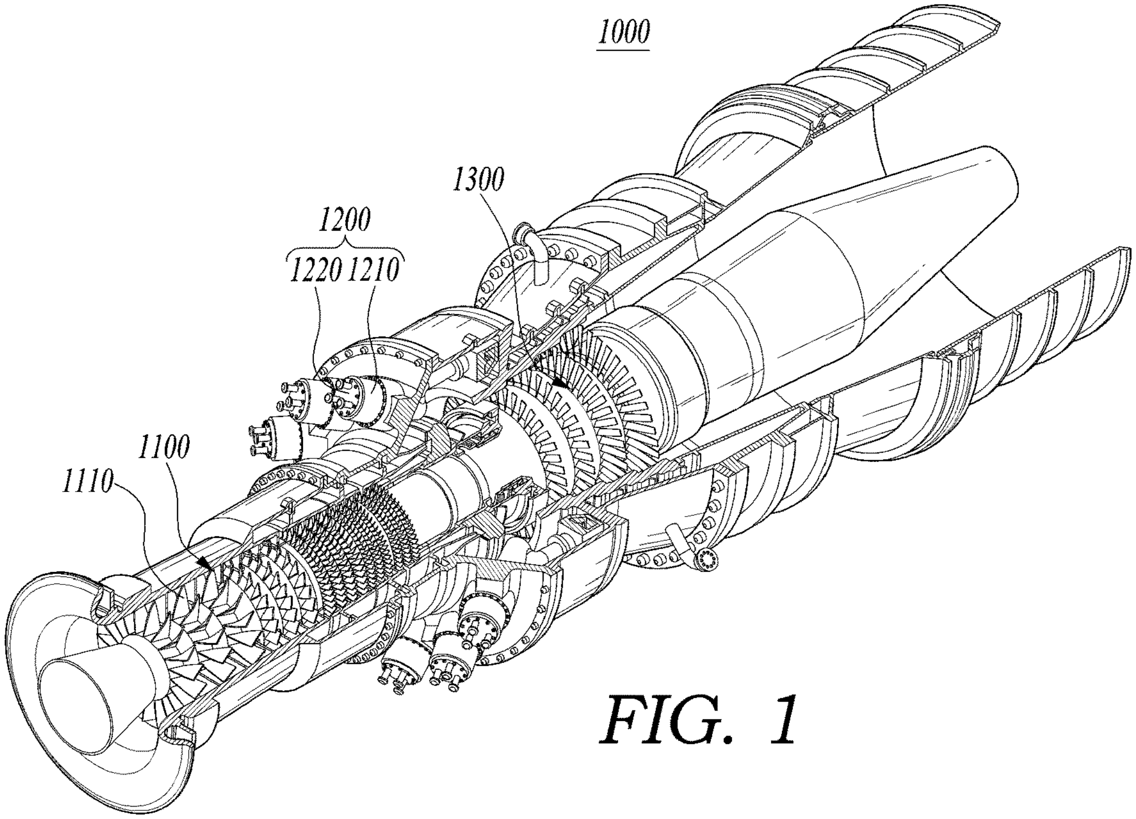
FIG. 1 is a partially cut-away perspective view of a gas turbine according to an embodiment of the present disclosure.

The present disclosure may be subject to various modifications and may have multiple embodiments, so it is intended to exemplify a specific embodiment and explain it in detail in the detailed description. However, it should be noted that the present disclosure is not limited thereto, and may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
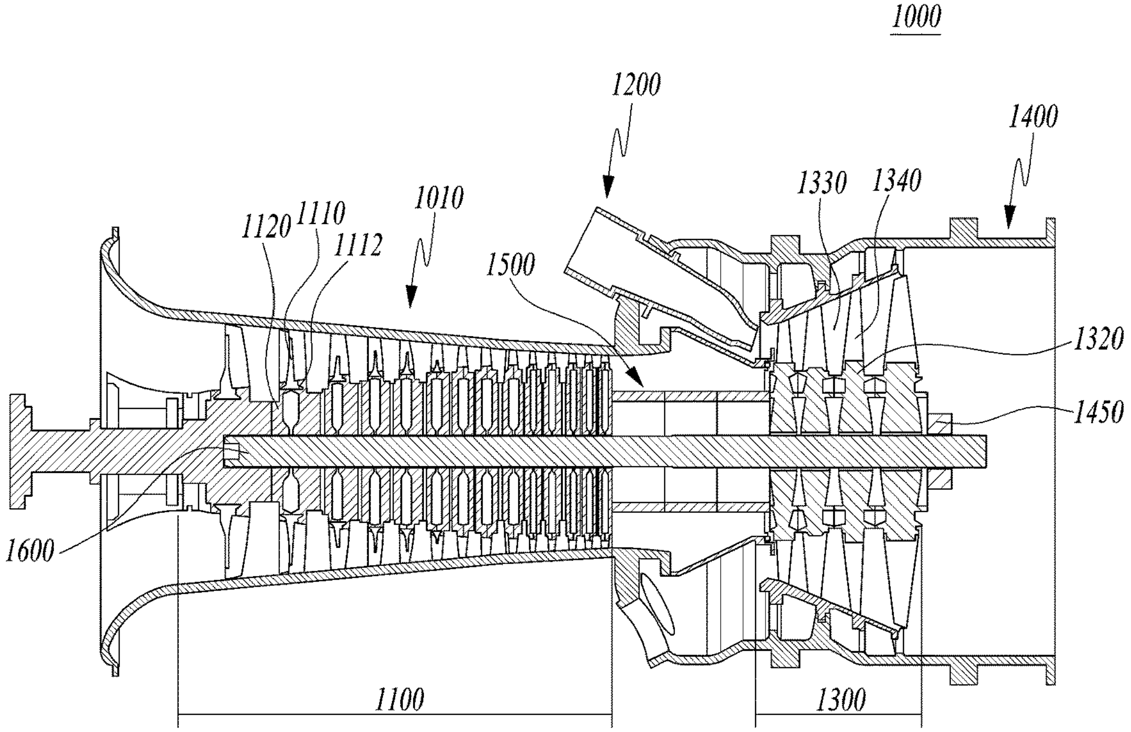
FIG. 2 is a cross-sectional view illustrating the schematic structure of the gas turbine according to the embodiment of the present disclosure.
Figure 3:
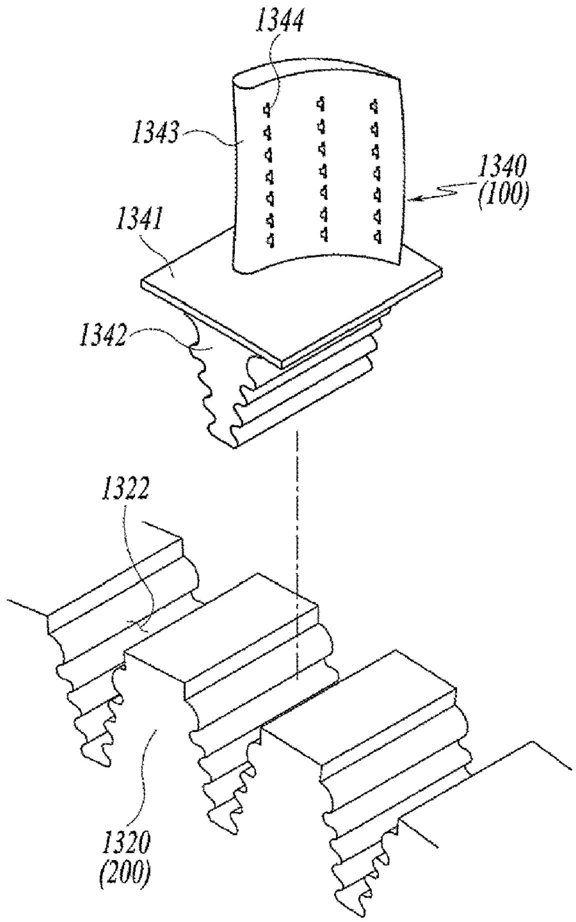
FIG. 3 is an exploded perspective view illustrating a turbine rotor disk of FIG. 2.

FIG. 1 is a partially cut-away perspective view of a gas turbine according to an embodiment of the present disclosure; FIG. 2 is a cross-sectional view illustrating the schematic structure of the gas turbine according to the embodiment of the present disclosure; and FIG. 3 is an exploded perspective view illustrating a turbine rotor disk of FIG. 2.

As illustrated in FIG. 1, the gas turbine 1000 according to the embodiment of the present disclosure includes a compressor 1100, a combustor 1200, and a turbine 1300. The compressor 1100 includes multiple blades 1110 installed radially. The compressor 1100 rotates the blades 1110, and while air is compressed by the rotation of the blades 1110, the air moves. The size and installation angles of the blades 1110 may vary depending on an installation location. In the embodiment, the compressor 1100 is directly or indirectly connected to the turbine 1300 and may receive some of power generated by the turbine 1300 and use the power to rotate the blades 1110.

The air compressed in the compressor 1100 moves to the combustor 1200. The combustor 1200 includes a plurality of combustion chambers 1210 and fuel nozzle modules 1220 arranged in an annular shape.

As illustrated in FIG. 2, the gas turbine 1000 according to the embodiment of the present disclosure includes a housing 1010, wherein a diffuser 1400 that discharges combustion gas that have passed through the turbine is provided at the rear of the housing 1010. In addition, the combustor 1200, which receives and combusts compressed air, is disposed at the front of the diffuser 1400.

Based on the direction of an air flow, the compressor 1100 is located on the upstream side of the housing 1010, and a turbine 1300 is located on the downstream side of the housing 1010. In addition, a torque tube unit 1500 as a torque transmission member that transmits rotational torque generated by the turbine 1300 to the compressor 1100 is disposed between the compressor 1100 and the turbine 1300.

The compressor 1100 includes a plurality of compressor rotor disks 1120 (for example, fourteen compressor rotor disks), and each of the compressor rotor disks 1120 is connected to each other by a tie rod 1600 so as not to be spaced apart from each other in an axial direction.

Specifically, each of the compressor rotor disks 1120 is aligned along an axial direction with the tie rod 1600 constituting a rotational shaft penetrating through an approximate center of the compressor rotor disk. Here, the opposing surfaces of the neighboring compressor rotor disks 1120 are compressed by the tie rod 1600, so that relative rotations of the neighboring compressor rotor disks 1120 are impossible.

The plurality of blades 1110 are radially coupled to the outer peripheral surface of the compressor rotor disk 1120. Each of the blades 1110 has a dovetail part 1112 and is coupled to the compressor rotor disk 1120.

A vane (not shown) disposed by being fixed to the housing 1010 is located between each of the rotor disks 1120. The vane is fixed so as not to rotate, unlike the rotor disk and serves to align the flow of compressed air passing through the blade of the compressor rotor disk and guide the air to the blade of a rotor disk located at the downstream side.

The coupling method of the dovetail part 1112 includes a tangential-type coupling and an axial-type coupling. This may be selected according to the required structure of a gas turbine in use, and a coupling device of a commonly known dovetail or fir-tree shape may be used. In some cases, the blade may be coupled to the rotor disk by using a coupling device other than the above type, for example, a fixer such as a key or bolt.

The tie rod 1600 is arranged to penetrate the centers of the plurality of compressor rotor disks 1120 and turbine rotor disks 1320, and may be composed of one or more tie rods. A first end of the tie rod 1600 is coupled within a compressor rotor disk located on the most upstream side, and a second end of the tie rod 1600 is coupled by a fixing nut 1450.

The shape of the tie rod 1600 may have various structures depending on the gas turbine, and is not limited to the form presented in FIG. 2. That is, as illustrated in the drawing, one tie rod may penetrate the centers of the rotor disks, a plurality of tie rods may be arranged circumferentially, and a combination thereof is also possible.

Although not shown, in the compressor of the gas turbine, a vane, which acts as a guide vane, may be installed at a position next to the diffuser to adjust the flow angle of fluid entering the inlet of the combustor to a design flow angle after increasing the pressure of the fluid. The vane is called a deswirler.

The combustor 1200 mixes incoming compressed air with fuel and combusts the fuel to produce high-energy, high-temperature, and high-pressure combustion gas, and through an isobaric combustion process, the temperature of the combustion gas is raised to a heat resistance limit that the combustor and the turbine can withstand.

The combustor, which constitutes the combustion system of the gas turbine, may include multiple combustors arranged within the housing, which is formed in a cell shape, and includes a burner including a fuel injection nozzle, etc., a combustor liner that constitutes a combustion chamber, and a transition piece that is a connection part between the combustor and the turbine.

Specifically, the liner provides a combustion space in which fuel injected by the fuel injection nozzle is mixed with compressed air of the compressor and burned. Such a liner may include a flame tank that provides a combustion space in which fuel mixed with air is burned, and a flow sleeve that forms an annular space while surrounding the flame tank. In addition, the fuel nozzle is coupled to the front end of the liner, and a spark plug is attached to a side wall.

Meanwhile, the transition piece is connected to the rear end of the liner to send combustion gas burned by the spark plug to the turbine side. The outer wall of this transition piece is cooled by compressed air supplied from the compressor to prevent damage due to the high temperature of combustion gas.

To this end, the transition piece is provided with holes for cooling so that air can be sprayed inside, and compressed air cools a main body inside through the holes and then flows to the liner.

Cooling air that cools the transition piece described above flows in the annular space of the liner, and compressed air from the outside of the flow sleeve is provided as cooling air through cooling holes provided in the flow sleeve, and may collide with the outer wall of the liner.

Meanwhile, high-temperature and high-pressure combustion gas from the combustor is supplied to the turbine 1300 described above. As the supplied high-temperature and high-pressure combustion gas expands, the gas collides with the rotor blades of the turbine, giving a recoil force thereto and causing rotational torque, the rotational torque obtained in this way is transmitted to the compressor through the torque tube described above, and power that exceeds power required to drive the compressor is used to drive a generator, etc.

The turbine 1300 is fundamentally similar in structure to a compressor. That is, the turbine 1300 is also provided with the plurality of turbine rotor disks 1320, which is similar to the compressor rotor disks 1120 of the compressor 1100. Accordingly, the turbine rotor disks 1320 include a plurality of turbine blades 1340 arranged radially. Each of the turbine blades 1340 may be coupled to the turbine rotor disk 1320 in a dovetail manner. Furthermore, a turbine vane 1330 fixed to the housing is provided between the turbine blades 1340 of the turbine rotor disks 1320, and guides the flow direction of combustion gas as it encounters the blade.

Referring to FIG. 3, the turbine rotor disk 1320 has an approximate disk shape, and has a plurality of coupling slots 1322 formed on an outer periphery there. Each of the coupling slots 1322 is formed to have a curved surface in the shape of a fir-tree.

The turbine blade 1340 is coupled to the coupling slot 1322. In FIG. 3, the turbine blade 1340 has a platform part 1341 in the form of a flat plate at an approximately middle part thereof. The platform part 1341 and a platform part 1341 of an adjacent turbine blade respectively have side surfaces in contact with each other and serve to maintain a gap between the blades.

A root part 1342 is formed on the lower surface of the platform part 1341. The root part 1342 has an axial-type shape that the root part 1342 is inserted into the coupling slot 1322 of the turbine rotor disk 1320 described above along the axial direction of the turbine rotor disk 1320.

The root part 1342 has a curved part in the approximate shape of a fir tree, wherein the curved part is formed to correspond to the shape of the curved part formed in the coupling slot. Here, the coupling structure of the root part does not necessarily have to have a fir tree shape, but may be formed to have a dovetail shape.

A blade part 1343 is formed on the upper surface of the platform part 1341. The blade part 1343 is formed to have an airfoil optimized according to the specifications of the gas turbine, and has a leading edge disposed on an upstream side and a trailing edge disposed on a downstream side relative to the flow direction of combustion gas.

Here, unlike the compressor's blades, the turbine's blades come into direct contact with high-temperature and high-pressure combustion gas. Since the temperature of the combustion gas is high enough to reach 1700 degrees Celsius, a cooling means is required. For this purpose, there is provided a cooling flow path that extracts compressed air from some parts of the compressor and supplies the air to the blades of the turbine.

The cooling flow path may extend outside the housing (an external flow path), may extend through the inside of the rotor disk (an internal flow path), or may include both external and internal flow paths. In FIG. 3, the blade part has multiple film cooling holes 1344 formed in a surface thereof, wherein the film cooling holes 1344 communicate with a cooling flow path (not shown) formed inside the blade part 1343 and serve to supply cooling air to the surface of the blade part 1343.

Meanwhile, the blade part 1343 of the turbine is rotated by combustion gas inside the housing, and a gap exists between the end of the blade part 1343 and the inner surface of the housing so that the blade part can rotate smoothly. However, as described above, combustion gas may leak through the gap, so a sealing means is required to block this leakage.

Each of the turbine vane and the turbine blade has the form of an airfoil and is composed of a leading edge, a trailing edge, a suction surface, and a pressure surface. The interior of each of the turbine vane and the turbine blade includes a complex labyrinth structure that has a cooling system. Cooling circuits within each of the vane and blade receive cooling fluid, such as air, from the compressor of a turbine engine, and the fluid passes through end parts of the vane and blade configured to be coupled to the vane and blade carriers. The cooling circuits typically include multiple flow paths designed to maintain all surfaces of the turbine vane and blades at a relatively uniform temperature, wherein at least a portion of fluid passing through these cooling circuits is discharged through openings of the leading edge, trailing edge, suction surface, and pressure surface of the vane are discharged.

Figure 4:
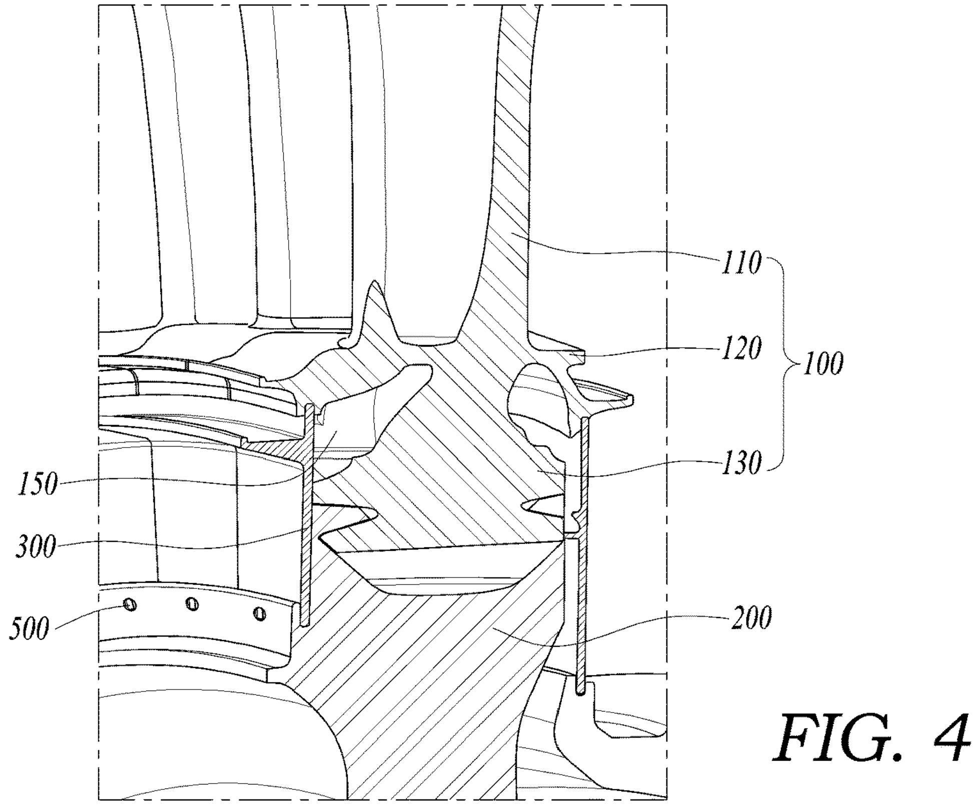
FIG. 4 is a partially cut-away perspective view schematically illustrating a turbine blade seal assembly structure according to the embodiment of the present disclosure.
Figure 5:
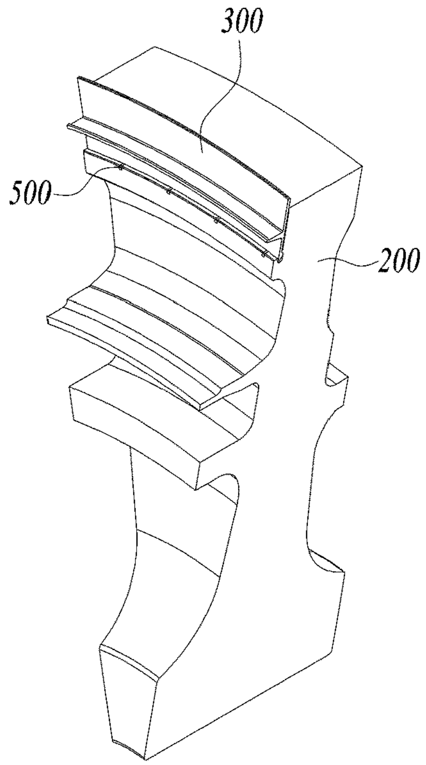
FIG. 5 is a perspective view illustrating a state in which a retainer plate is mounted on the turbine rotor disk.
Figure 6:
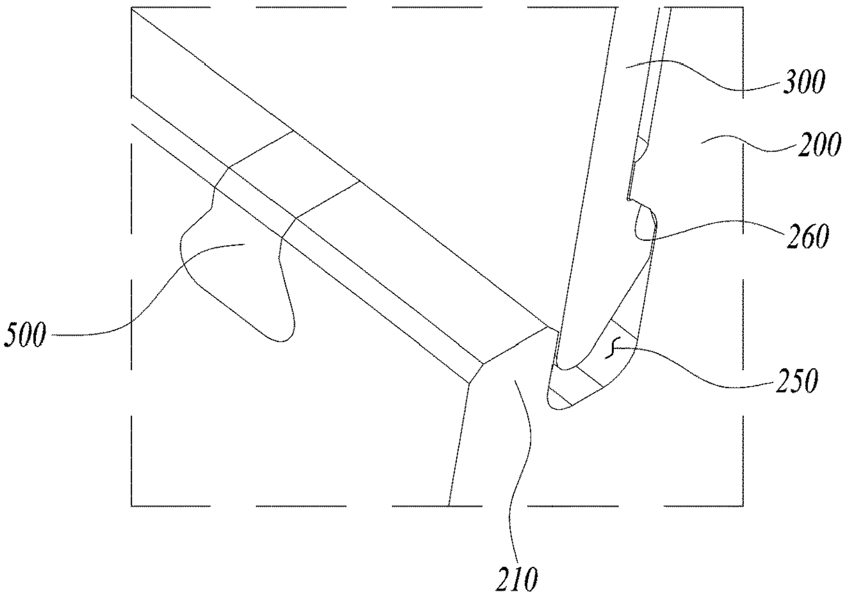
FIG. 6 is a partial perspective view illustrating the turbine blade seal assembly structure.
Figure 7:
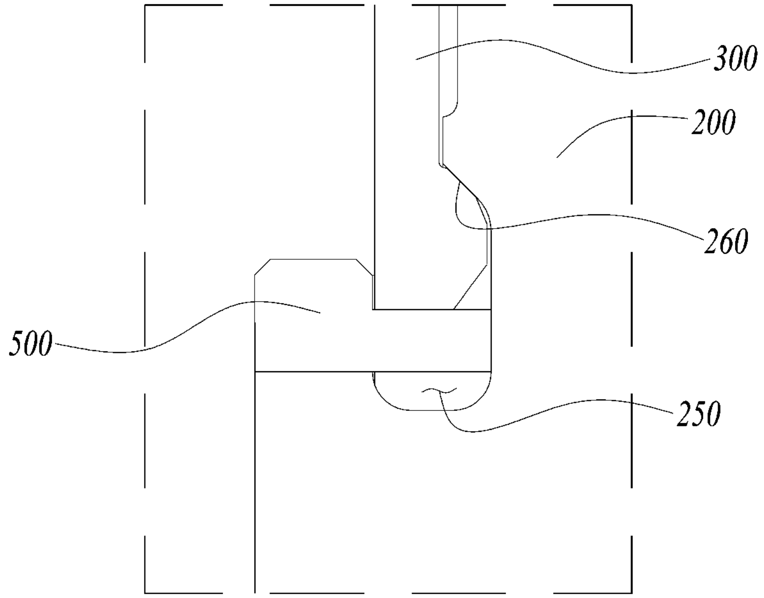
FIG. 7 is a partially cut-away perspective view cut in a plane passing through an insert key and perpendicular to the retainer plate in FIG. 6.

FIG. 4 is a partially cut-away perspective view schematically illustrating a turbine blade seal assembly structure according to the embodiment of the present disclosure; FIG. 5 is a perspective view illustrating a state in which a retainer plate is mounted on the turbine rotor disk; FIG. 6 is a partial perspective view illustrating the turbine blade seal assembly structure; and FIG. 7 is a partially cut-away perspective view cut in a plane passing through an insert key and perpendicular to the retainer plate in FIG. 6.

The turbine blade seal assembly structure of the present disclosure includes: the turbine blade 100 including an airfoil part 110, a platform part 120, and a root part 130; the turbine rotor disk 200 allowing the root part of the turbine blade to be mounted thereto and having a mounting rib 210 extending radially from one axial side of the turbine rotor disk 200 to form a mounting groove 250; a retainer plate 300 mounted between the platform part 120 and one side part of the turbine rotor disk and configured to seal a cooling flow path 150 formed inside the root part and the platform part; and an insert key 500 inserted axially into the upper end of the mounting rib 210 and inserted into the lower end of the retainer plate 300 to support the retainer plate.

As illustrated in FIGS. 3 and 4, the airfoil part 110 of the turbine blade 100, as described above, is composed of a leading edge, a trailing edge, a convex suction surface on a first side surface, and a concave pressure surface on a second side surface.

The platform part 120 having the shape of an approximately flat plate may be formed integrally on the radial inner side of the airfoil part 110. The platform part 120 may be formed to have a circumferential width greater than the thickness of the airfoil part 110.

The root part 130 may extend radially inward from the platform part 120 to be integrated therewith. The root part 130 may be formed to have a curved surface in the approximate shape of a fir-tree. As illustrated in FIG. 3, the root part 1342 or 130 may be inserted and mounted in the corresponding coupling slot 1322 of the turbine rotor disk 1320 or 200 having a curved surface in the form of a fir tree.

The turbine rotor disk 200 has an overall circular disk shape, but a through hole through which the tie rod 1600 passes is formed at the center of the turbine rotor disk 200, and a plurality of coupling slots 1322 may be arranged at regular intervals on the outer circumferential surface of the turbine rotor disk 200. The root part 130 of the turbine blade 100 may be inserted and installed in each of the coupling slots 1322.

In the embodiment of FIG. 4, the root part 130 of the turbine blade 100 may be installed by being inserted into the coupling slot of the turbine rotor disk 200 in a circumferential direction. That is, the turbine blade of FIG. 3 is mounted in an axial type on the turbine rotor disk, but the turbine blade of FIG. 4 may be mounted in a tangential type on the turbine rotor disk.

The cooling flow path 150 through which cooling air is supplied to the turbine blade 100 may be formed inside the root part 130 and the platform part 120. The retainer plate 300 may be mounted between the platform part 120 and one side part of the turbine rotor disk 200 to seal the cooling flow path 150.

The mounting rib 210 for forming the mounting groove 250 may be formed to extend in a radial direction on one side of the turbine rotor disk 200.

The retainer plate 300 can seal the cooling flow path 150 formed inside the root part 130 and the platform part 120. When the retainer plate 300 is mounted in the mounting groove 250 of the turbine rotor disk 200, the retainer plate 300 may be slantingly inserted thereto. Since the entrance width of the mounting groove 250 is smaller than the lower width of the mounting groove 250, the retainer plate 300 may be tilted to insert a radial inner end part thereof into the mounting groove 250.

As illustrated in FIGS. 6 and 7, the insert key 500 may be axially inserted into a groove formed in the upper end of the mounting rib 210, and further, may be inserted and mounted into a groove formed in the lower end of the retainer plate 300. The insert key 500 can support the retainer plate so that the retainer plate is prevented from moving in a circumferential direction and outward in a radial direction.

Figure 8:
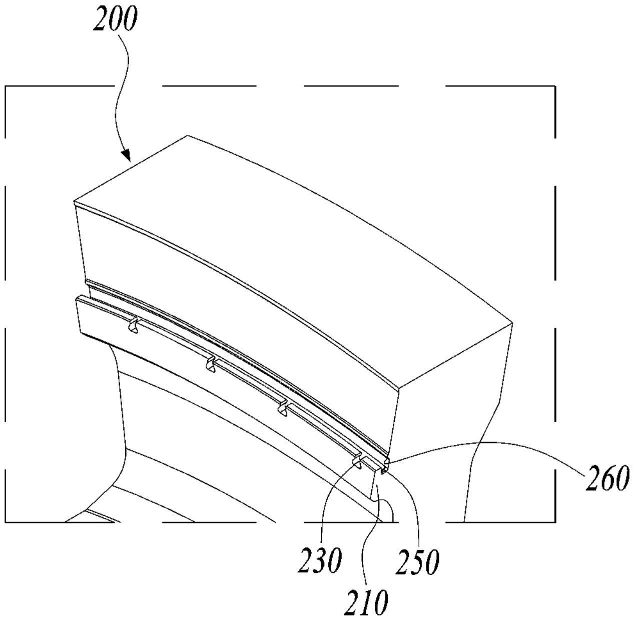
FIG. 8 is a perspective view illustrating the upper part of the turbine rotor disk.
Figure 9:
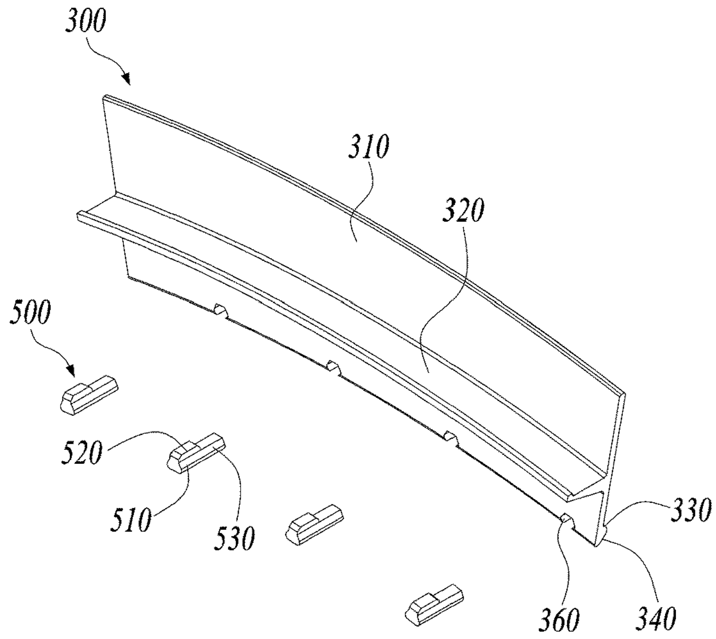
FIG. 9 is an exploded perspective view illustrating the retainer plate and the insert key in the turbine blade seal assembly structure.
Figure 10:
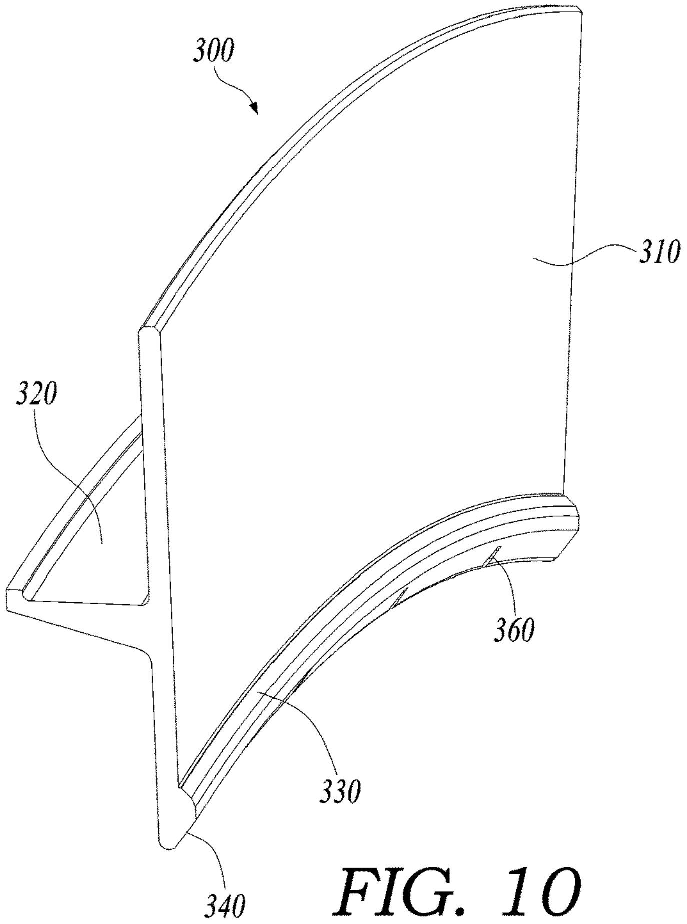
FIG. 10 is a perspective view illustrating the retainer plate viewed from another side.
Figure 11:
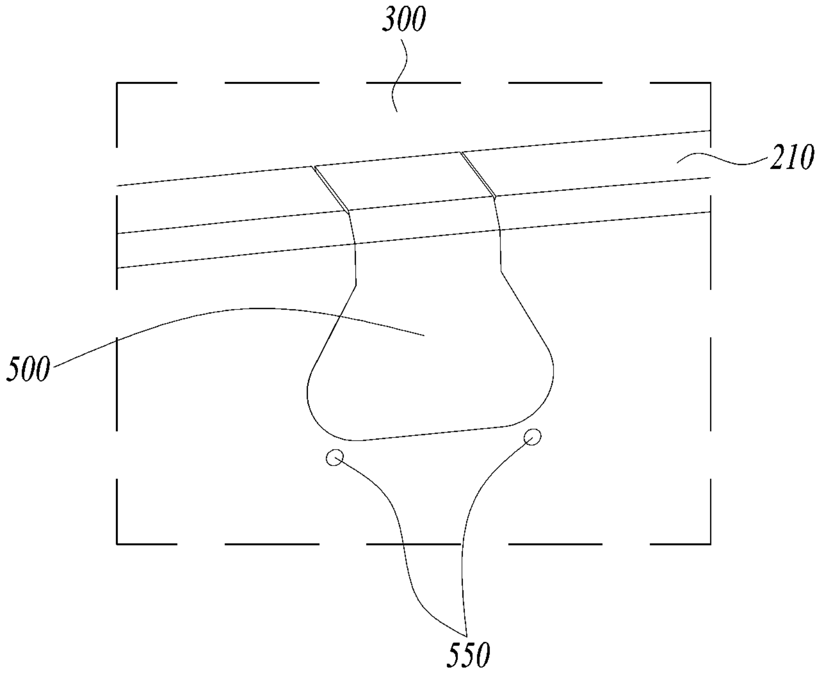
FIG. 11 is a partial front view illustrating the insert key fixed to a mounting rib by punching the mounting rib.

FIG. 8 is a perspective view illustrating the upper part of the turbine rotor disk; FIG. 9 is an exploded perspective view illustrating the retainer plate and the insert key in the turbine blade seal assembly structure; FIG. 10 is a perspective view illustrating the retainer plate viewed from another side; and FIG. 11 is a partial front view illustrating the insert key fixed to a mounting rib by punching the mounting rib.

The mounting rib 210 may include a key slot 230 formed by penetrating the mounting rib 210 in a thickness direction thereof from the upper surface of the mounting rib 210 so that the insert key 500 is inserted into the key slot 230.

The key slot 230 is formed to have a predetermined depth from the upper surface of the mounting rib 210, and may be formed to penetrate the mounting rib 210 in the thickness direction, that is, in an axial direction.

The key slot 230 may be formed such that the upper width of the key slot 230 is smaller than the lower width thereof.

The key slot 230 is formed to be open on the upper surface of the mounting rib 210 and has the upper width smaller than the lower width, and thus the insert key 500 inserted into the key slot 230 can be fixed so that the insert key 500 is not removed outward in a radial direction.

As illustrated in FIG. 9, the insert key 500 may include a body part 510 inserted into a lower part of the key slot 230, an upper part 520 formed integrally on the body part and inserted into the upper part of the key slot 230, and an insertion protrusion part 530 extending from the body part and inserted into the lower end of the retainer plate.

The body part 510 may be formed to be convex outward at opposite sides thereof. The body part 510 may have a longitudinal cross-section of an approximately trapezoid shape. The lower opposite edges of the body part 510 may be formed to be round. The body part 510 can be inserted and mounted in the lower part of the key slot 230 corresponding to the body part 510.

The upper part 520 may be formed integrally on the upper surface of the body part 510. The upper part 520 may have a longitudinal cross section of a rectangular shape. The upper part 520 may be formed to have length corresponding to the thickness of the mounting rib 210.

The insertion protrusion part 530 may be formed by extending a predetermined length in an axial direction from the body part 510 to have the same cross-sectional shape as that of the body part 510. The insertion protrusion part 530 may be formed to have length corresponding to the axial width of the mounting groove 250.

The body part 510 may be formed to have a width decreasing gradually upward.

Not only is the width of the body part 510 smaller than the width of the upper part 520, but the body part 510 is also formed in a streamlined shape to have a width decreasing gradually upward, so the insert key 500 is fixed in the key slot 230 without being removed in a radial direction, and stress concentration thereon can be prevented.

The upper part 520 may be formed to have a constant width. The upper part 520 may be formed integrally on the upper end of the body part 510 by extending upward at a constant width therefrom. Accordingly, the insert key 500 and the key slot 230 corresponding thereto can be easily formed.

As illustrated in FIGS. 9 and 10, the retainer plate 300 may include an inclined surface part 330 inserted into the mounting groove 250 of the turbine rotor disk 200 to be supported radially outward.

The retainer plate 300 may include a body plate 310 in the form of a flat plate, a flange part 320 extending in an approximately perpendicular direction from one side of the body plate, and an inclined surface part 330 formed on the opposite side surface of the flange part on the lower end part of the body plate.

As illustrated in FIG. 6, the inclined surface part 330 is in contact with an inclined surface part 260 formed on one upper side of the mounting groove 250, so that the retainer plate 300 may be supported radially outward.

On the opposite side of the inclined surface part 330, that is, on a radial inner side, a chamfered surface 340 may be formed. When the lower end part of the retainer plate 300 is tilted and inserted into the mounting groove 250, the chamfered surface 340 can prevent the lower edge of the retainer plate 300 from interfering with the inner surface of the mounting groove 250.

The retainer plate 300 may further include a protrusion insertion groove 360 formed in the lower surface thereof so that the insert key 500 is inserted into the protrusion insertion groove 360.

The protrusion insertion groove 360 may be formed in the lower surface of the retainer plate 300 in a shape corresponding to the cross section of the insertion protrusion part 530 of the insert key 500.

As illustrated in FIGS. 7 and 10, the protrusion insertion groove 360 may be formed in the chamfered surface 340 to be disposed under the upper end of the chamfered surface 340.

As illustrated in FIGS. 8 to 10, the key slot 230 of the mounting rib 210 may include a plurality of key slots, and the insert key 500 may be inserted into each of the plurality of key slots 230.

The retainer plate 300 may be formed in the shape of a circular disk divided into a plurality of pieces. One retainer plate 300 may be disposed for two turbine blades 100.

The key slot 230 of the mounting rib 210 may include a plurality of key slots. For example, four key slots 230 may be formed in one mounting rib 210. In this case, four protrusion insertion grooves 360 may be formed in the retainer plate 300.

A separate insert key 500 may be inserted into each of the plurality of key slots 230 and the protrusion insertion grooves 360.

As illustrated in FIG. 11, a surface near a lower end of the insert key 500 inserted into the key slot 230 of the mounting rib 210 is punched so that the insert key 500 can be axially fixed.

On the front of the mounting rib 210, a punched part 550 may be placed in each of two positions directly below the insert key 500. The insert key 500 can be fixed by punching one pair of positions of the punched parts 550 by using a chisel. Accordingly, the insert key 500 can be fixed so that the insert key 500 is not removed in an axial direction from the key slot 230.

The sequence of the turbine blade seal assembly will be described with reference to the accompanying drawings.

First, the lower end part of the retainer plate 300 is tilted and inserted into the mounting groove 250.

Next, the retainer plate 300 is moved upward so that the inclined surface part 330 is supported on the inclined surface part 260 of the mounting groove 250.

Next, the positions of the key slot 230 and the protrusion insertion groove 360 are aligned with each other, and then the insert key 500 is inserted into the key slot 230 and the protrusion insertion groove 360.

Next, one pair of punched parts 550 is punched to fix the insert key 500 so that assembly thereof is completed.

According to the turbine blade seal assembly structure, with respect to centrifugal force, the retainer plate 300 may be supported by the inclined surface part 260 of the mounting groove 250, and the insert key 500 may be supported radially outward by the key slot 230.

With respect to gravity, the retainer plate 300 may be supported by the insert key 500.

In the axial direction, the lower end part of the retainer plate 300 may be disposed within the mounting groove 250 to be axially supported. The insert key 500 may be axially constrained by the punched part 550.

In the circumferential direction, the retainer plate 300 may be supported by the insert key 500 inserted into the key slot 230 of the mounting rib 210.

According to the turbine blade seal assembly structure and the gas turbine including the same of the present disclosure, the lower end part of the retainer plate is fixed to the turbine rotor disk, a part of a fixing member protruding from each of the retainer plate and the rotor disk is removed to reduce efficiency loss due to gas friction, a load applied to the root part of the blade can be minimized to improve the structural stability of the blade, stress concentration on the turbine rotor disk and the retainer plate can be minimized, and parts can be easily processed and assembled.

While the embodiment of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

The invention claimed is:

1. A turbine blade seal assembly structure comprising:
- a turbine blade comprising an airfoil part, a platform part, and a root part;
- a turbine rotor disk allowing the root part of the turbine blade to be mounted thereto and having a mounting rib extending radially from one axial side of the turbine rotor disk to form a mounting groove;
- a retainer plate mounted between the platform part and one side part of the turbine rotor disk so as to seal a cooling flow path formed inside the root part and the platform part; and
- an insert key inserted axially into an upper end of the mounting rib and inserted into a lower end of the retainer plate to support the retainer plate.

2. The structure of claim 1, wherein the mounting rib comprises a key slot formed by penetrating the mounting rib in a thickness direction thereof from an upper surface thereof so that the insert key is inserted into the key slot.

3. The structure of claim 2, wherein the key slot is formed such that an upper width of the key slot is smaller than a lower width thereof.

4. The structure of claim 3, wherein the insert key comprises:
- a body part inserted into a lower part of the key slot;
- an upper part formed integrally on the body part and inserted into an upper part of the key slot; and
- an insertion protrusion part extending from the body part and inserted into the lower end of the retainer plate.

5. The structure of claim 4, wherein the body part is formed to have a width decreasing gradually upward.

6. The structure of claim 5, wherein the upper part is formed to have a constant width.

7. The structure of claim 2, wherein the retainer plate comprises an inclined surface part inserted into the mounting groove of the turbine rotor disk to be supported radially outward.

8. The structure of claim 7, wherein the retainer plate further comprises a protrusion insertion groove formed in a lower surface thereof so that the insert key is inserted into the protrusion insertion groove.

9. The structure of claim 2, wherein a surface near a lower end of the insert key inserted into the key slot of the mounting rib is punched so that the insert key is axially fixed.

10. The structure of claim 2, wherein the key slot of the mounting rib comprises a plurality of key slots, wherein the insert key is inserted into each of the plurality of key slots.

11. A gas turbine comprising:
- a compressor configured to suck in and compress outside air;
- a combustor configured to mix fuel with air compressed in the compressor and combust the fuel; and
- a turbine rotated by combustion gas discharged from the combustor, wherein the turbine comprises:
- a turbine blade comprising an airfoil part, a platform part, and a root part;
- a turbine rotor disk allowing the root part of the turbine blade to be mounted thereto and having a mounting rib extending radially from one axial side of the turbine rotor disk to form a mounting groove;
- a retainer plate mounted between the platform part and one side part of the turbine rotor disk so as to seal a cooling flow path formed inside the root part and the platform part; and
- an insert key inserted axially into an upper end of the mounting rib and inserted into a lower end of the retainer plate to support the retainer plate.

12. The gas turbine of claim 11, wherein the mounting rib comprises a key slot formed by penetrating the mounting rib in a thickness direction thereof from an upper surface thereof so that the insert key is inserted into the key slot.

13. The gas turbine of claim 12, wherein the key slot is formed such that an upper width of the key slot is smaller than a lower width thereof.

14. The gas turbine of claim 13, wherein the insert key comprises:
- a body part inserted into a lower part of the key slot;
- an upper part formed integrally on the body part and inserted into an upper part of the key slot; and
- an insertion protrusion part extending from the body part and inserted into the lower end of the retainer plate.

15. The gas turbine of claim 14, wherein the body part is formed to have a width decreasing gradually upward.

16. The gas turbine of claim 15, wherein the upper part is formed to have a constant width.

17. The gas turbine of claim 12, wherein the retainer plate comprises an inclined surface part inserted into the mounting groove of the turbine rotor disk to be supported radially outward.

18. The gas turbine of claim 17, wherein the retainer plate further comprises a protrusion insertion groove formed in a lower surface thereof so that the insert key is inserted into the protrusion insertion groove.

19. The gas turbine of claim 12, wherein a surface near a lower end of the insert key inserted into the key slot of the mounting rib is punched so that the insert key is axially fixed.

20. The gas turbine of claim 12, wherein the key slot of the mounting rib comprises a plurality of key slots, wherein the insert key is inserted into each of the plurality of key slots.

* * * * *